(12) United States Patent
Goel

(10) Patent No.: US 11,159,359 B2
(45) Date of Patent: Oct. 26, 2021

(54) METHODS, SYSTEMS, AND COMPUTER READABLE MEDIA FOR DIAMETER-PEER-WIDE EGRESS RATE LIMITING AT DIAMETER RELAY AGENT (DRA)

(71) Applicant: Oracle International Corporation, Redwood Shores, CA (US)

(72) Inventor: Yesh Goel, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/697,021

(22) Filed: Nov. 26, 2019

(65) Prior Publication Data

US 2020/0412597 A1    Dec. 31, 2020

Related U.S. Application Data

(63) Continuation-in-part of application No. 16/453,955, filed on Jun. 26, 2019, now Pat. No. 10,819,636.

(51) Int. Cl.
     *H04L 12/24*      (2006.01)

(52) U.S. Cl.
     CPC ........ *H04L 41/046* (2013.01); *H04L 41/0896* (2013.01); *H04L 41/5054* (2013.01)

(58) Field of Classification Search
     CPC ....... H04L 47/10; H04L 67/28; H04L 41/046; H04L 41/5054; H04L 41/0896
(Continued)

(56) References Cited

U.S. PATENT DOCUMENTS

| 5,381,413 A | 1/1995 | Tobagi et al. |
| 6,748,435 B1 * | 6/2004 | Wang ............... H04L 43/00 370/230 |

(Continued)

FOREIGN PATENT DOCUMENTS

| CN | 105635345 B | 2/2019 |
| CN | 109788078 A | 5/2019 |

(Continued)

OTHER PUBLICATIONS

Final Office Action for U.S. Appl. No. 16/356,446 (dated Sep. 8, 2020).

(Continued)

*Primary Examiner* — Michael Won
(74) *Attorney, Agent, or Firm* — Jenkins, Wilson, Taylor & Hunt, P.A.

(57) ABSTRACT

Methods, systems, and computer readable media for Diameter-peer-wide egress rate limiting include a process performed at a Diameter relay agent (DRA) and at a rate limiting policer. The process includes receiving service requests from Diameter-based consumers and forwarding the service requests to DRA worker instances. The process further includes, at the DRA worker instances, requesting, from the rate limiting policer, which is separate from the DRA worker instances, Diameter peer capacity for handling the service requests. The process includes, at the rate limiting policer, performing Diameter-peer-wide egress rate limiting between the DRA worker instances and Diameter peer instances by granting or denying requests for Diameter peer capacity from the DRA worker instances such that combined egress traffic from the DRA worker instances does not exceed rate capacities of the Diameter peers.

20 Claims, 9 Drawing Sheets

(58) Field of Classification Search
USPC .................................. 709/230, 232, 233, 235
See application file for complete search history.

(56) References Cited

U.S. PATENT DOCUMENTS

| | | | |
|---|---|---|---|
| 7,782,776 | B2 | 8/2010 | Shankar et al. |
| 8,023,482 | B2 | 9/2011 | Gong et al. |
| 8,300,637 | B1 | 10/2012 | Bennett, III et al. |
| 8,645,565 | B2* | 2/2014 | Sparks ................ H04L 61/1511 |
| | | | 709/235 |
| 8,811,228 | B2 | 8/2014 | Lopez et al. |
| 8,879,431 | B2* | 11/2014 | Ridel ...................... H04L 67/32 |
| | | | 370/259 |
| 8,954,080 | B2 | 2/2015 | Janakiraman et al. |
| 9,246,762 | B1 | 1/2016 | Watkins |
| 9,667,590 | B2 | 5/2017 | Yan et al. |
| 10,097,504 | B2 | 10/2018 | Backholm |
| 10,285,155 | B1 | 5/2019 | Dodd-Noble et al. |
| 10,299,128 | B1 | 5/2019 | Suthar et al. |
| 10,361,843 | B1 | 7/2019 | Suthar et al. |
| 10,595,256 | B1 | 3/2020 | Marupaduga et al. |
| 10,609,154 | B2 | 3/2020 | Talebi Fard et al. |
| 10,609,530 | B1 | 3/2020 | Patil et al. |
| 10,616,934 | B2 | 4/2020 | Talebi Fard et al. |
| 10,652,098 | B2 | 5/2020 | Kim |
| 10,772,062 | B1 | 9/2020 | Albasheir et al. |
| 10,778,527 | B2 | 9/2020 | Assali et al. |
| 10,791,044 | B1 | 9/2020 | Krishan et al. |
| 10,819,636 | B1 | 10/2020 | Goel |
| 10,880,370 | B2* | 12/2020 | Seenappa ............ H04L 67/1029 |
| 2003/0174649 | A1 | 9/2003 | Shankar et al. |
| 2003/0223414 | A1 | 12/2003 | Wong |
| 2004/0003069 | A1 | 1/2004 | Wong |
| 2004/0141473 | A1 | 7/2004 | Buot |
| 2004/0208183 | A1* | 10/2004 | Balachandran ....... H04L 47/215 |
| | | | 370/395.21 |
| 2005/0193096 | A1 | 9/2005 | Yu et al. |
| 2006/0010224 | A1 | 1/2006 | Sekar et al. |
| 2007/0242738 | A1* | 10/2007 | Park ...................... H04L 63/102 |
| | | | 375/224 |
| 2009/0055835 | A1* | 2/2009 | Zhu ...................... H04W 28/08 |
| | | | 718/105 |
| 2009/0141625 | A1* | 6/2009 | Ghai ..................... H04L 47/14 |
| | | | 370/230 |
| 2009/0222584 | A1 | 9/2009 | Josefsberg et al. |
| 2011/0078674 | A1 | 3/2011 | Ershov |
| 2011/0202604 | A1* | 8/2011 | Craig .................... H04L 45/34 |
| | | | 709/205 |
| 2013/0029708 | A1 | 1/2013 | Fox et al. |
| 2013/0039176 | A1 | 2/2013 | Kanode et al. |
| 2013/0198269 | A1 | 8/2013 | Fleischman et al. |
| 2013/0272123 | A1 | 10/2013 | Lee et al. |
| 2014/0040975 | A1* | 2/2014 | Raleigh ................ G06Q 30/016 |
| | | | 726/1 |
| 2014/0379901 | A1 | 12/2014 | Tseitlin et al. |
| 2015/0016266 | A1 | 1/2015 | Dumitrescu et al. |
| 2015/0071074 | A1* | 3/2015 | Zaidi ..................... H04L 47/215 |
| | | | 370/235.1 |
| 2015/0263987 | A1 | 9/2015 | Klein et al. |
| 2016/0142324 | A1 | 5/2016 | Vihtari et al. |
| 2016/0156513 | A1 | 6/2016 | Zhang et al. |
| 2016/0164788 | A1 | 6/2016 | Goel et al. |
| 2016/0234119 | A1* | 8/2016 | Zaidi ..................... H04L 47/22 |
| 2016/0315743 | A1 | 10/2016 | Nagaraj et al. |
| 2016/0352588 | A1 | 12/2016 | Subbarayan et al. |
| 2017/0221015 | A1 | 8/2017 | June et al. |
| 2018/0039494 | A1 | 2/2018 | Lander et al. |
| 2018/0083882 | A1* | 3/2018 | Krishan ................ H04L 47/24 |
| 2018/0159780 | A1 | 6/2018 | Essigmann et al. |
| 2018/0183724 | A1 | 6/2018 | Callard et al. |
| 2018/0213391 | A1 | 7/2018 | Inoue |
| 2018/0262625 | A1 | 9/2018 | McCarley et al. |
| 2018/0285794 | A1 | 10/2018 | Gray-Donald et al. |
| 2018/0324247 | A1 | 11/2018 | Hood et al. |
| 2018/0324646 | A1 | 11/2018 | Lee et al. |
| 2018/0343567 | A1 | 11/2018 | Ashrafi |
| 2019/0007366 | A1 | 1/2019 | Voegele et al. |
| 2019/0045351 | A1 | 2/2019 | Zee et al. |
| 2019/0075552 | A1 | 3/2019 | Yu et al. |
| 2019/0116486 | A1 | 4/2019 | Kim et al. |
| 2019/0116521 | A1 | 4/2019 | Qiao et al. |
| 2019/0140895 | A1 | 5/2019 | Ennis, Jr. et al. |
| 2019/0158364 | A1 | 5/2019 | Zhang et al. |
| 2019/0173740 | A1 | 6/2019 | Zhang et al. |
| 2019/0174561 | A1 | 6/2019 | Sivavakeesar |
| 2019/0182875 | A1 | 6/2019 | Talebi Fard et al. |
| 2019/0191348 | A1 | 6/2019 | Futaki et al. |
| 2019/0191467 | A1 | 6/2019 | Dao et al. |
| 2019/0222633 | A1 | 7/2019 | Howes et al. |
| 2019/0223093 | A1 | 7/2019 | Watfa et al. |
| 2019/0230556 | A1 | 7/2019 | Lee |
| 2019/0261244 | A1 | 8/2019 | Jung et al. |
| 2019/0268270 | A1 | 8/2019 | Fattah |
| 2019/0306907 | A1 | 10/2019 | Andreoli-Fang et al. |
| 2019/0313236 | A1 | 10/2019 | Lee et al. |
| 2019/0313437 | A1 | 10/2019 | Jung et al. |
| 2019/0313469 | A1 | 10/2019 | Karampatsis et al. |
| 2019/0335002 | A1 | 10/2019 | Bogineni et al. |
| 2019/0335534 | A1 | 10/2019 | Atarius et al. |
| 2019/0342229 | A1 | 11/2019 | Khinvasara et al. |
| 2019/0342921 | A1 | 11/2019 | Loehr et al. |
| 2019/0349901 | A1 | 11/2019 | Basu Mallick et al. |
| 2019/0357092 | A1 | 11/2019 | Jung et al. |
| 2019/0380031 | A1 | 12/2019 | Suthar et al. |
| 2019/0394284 | A1 | 12/2019 | Baghel et al. |
| 2019/0394624 | A1 | 12/2019 | Karampatsis et al. |
| 2019/0394833 | A1 | 12/2019 | Talebi Fard et al. |
| 2020/0007632 | A1 | 1/2020 | Landais et al. |
| 2020/0008069 | A1 | 1/2020 | Zhu et al. |
| 2020/0028920 | A1 | 1/2020 | Livanos et al. |
| 2020/0045753 | A1 | 2/2020 | Dao et al. |
| 2020/0045767 | A1 | 2/2020 | Velev et al. |
| 2020/0053670 | A1 | 2/2020 | Jung et al. |
| 2020/0053724 | A1 | 2/2020 | MolavianJazi et al. |
| 2020/0053828 | A1 | 2/2020 | Bharatia et al. |
| 2020/0059420 | A1 | 2/2020 | Abraham |
| 2020/0059856 | A1 | 2/2020 | Cui et al. |
| 2020/0084663 | A1 | 3/2020 | Park et al. |
| 2020/0092423 | A1 | 3/2020 | Qiao et al. |
| 2020/0092424 | A1 | 3/2020 | Qiao et al. |
| 2020/0127916 | A1 | 4/2020 | Krishan |
| 2020/0136911 | A1 | 4/2020 | Assali et al. |
| 2020/0137174 | A1 | 4/2020 | Stammers et al. |
| 2020/0177629 | A1* | 6/2020 | Hooda .................. H04L 47/746 |
| 2020/0313996 | A1 | 10/2020 | Krishan et al. |
| 2020/0404608 | A1 | 12/2020 | Albasheir et al. |
| 2021/0000723 | A1 | 1/2021 | Strand et al. |
| 2021/0007020 | A1 | 1/2021 | Umapathy et al. |
| 2021/0044481 | A1 | 2/2021 | Xu et al. |
| 2021/0067480 | A1 | 3/2021 | Goel |
| 2021/0067485 | A1 | 3/2021 | Goel |
| 2021/0105214 | A1 | 4/2021 | Goel |

FOREIGN PATENT DOCUMENTS

| | | |
|---|---|---|
| EP | 2 575 303 A1 | 4/2013 |
| WO | WO 2017/143915 A1 | 8/2017 |
| WO | WO 2018/174021 A1 | 9/2018 |
| WO | WO 2018/174516 A1 | 9/2018 |
| WO | WO 2019/034609 A1 | 2/2019 |
| WO | WO 2019/062596 A1 | 4/2019 |
| WO | WO 2019/076273 A1 | 4/2019 |
| WO | WO 2019/144321 A1 | 8/2019 |
| WO | WO 2019/220172 A1 | 11/2019 |
| WO | WO 2020/091934 A1 | 5/2020 |
| WO | WO 2020/263486 A1 | 12/2020 |
| WO | WO 2021/040827 A1 | 3/2021 |
| WO | WO 2021/055998 A1 | 3/2021 |

OTHER PUBLICATIONS

Notice of Allowance and Fee(s) Due and Examiner-Initiated Interview Summary for US. Appl. No. 16/453,955 (dated Aug. 26, 2020).

(56) References Cited

OTHER PUBLICATIONS

Notification of the Transmittal of the International Search Report and the Written Opinion of the International Searching Authority, or the Declaration for International Application No. PCT/US2020/034723 (dated Aug. 17, 2020).
Non-Final Office Action for U.S. Appl. No. 16/555,817 (dated Aug. 7, 2020).
Notification of Transmittal of the International Search Report and the Written Opinion of the International Searching Authority, or the Declaration for International Application Serial No. PCT/US2020/035004 (dated Jul. 7, 2020).
Notice of Allowance and Fee(s) Due for U.S. Appl. No. 16/369,691 (dated May 12, 2020).
Non-Final Office Action for U.S. Appl. No. 16/356,446 (dated May 11, 2020).
Notice of Allowance and Fee(s) Due for U.S. Appl. No. 16/176,920 (dated Apr. 16, 2020).
Applicant-Initiated Interview Summary for U.S. Appl. No. 16/176,920 (dated Apr. 1, 2020).
"3rd Generation Partnership Project; Technical Specification Group Core Network and Terminals; 5G Systems; Network Function Repository Services; Stage 3 (Release 16)," 3GPP TS 29.510 V.16.1.1, pp. 1-150 (dated Oct. 2019).
"3rd Generation Partnership Project; Technical Specification Group Core Network and Terminals; 5G System; Technical Realization of Service Based Architecture; Stage 3 (Release 16)," 3GPP TS 29.500 V16.1.0, pp. 1-43 (Sep. 2019).
"3rd Generation Partnership Project; Technical Specification Group Service and System Aspects; System Architecture for the 5G System (5GS); Stage 2 (Release 16)," 3GPP TS 23.501 V16.2.0, pp. 1-391 (Sep. 2019).
Cheshire et al., "Apple's DNS Long-Lived Queries protocol," Network Working Group, Apple, Inc., pp. 1-26 (Aug. 22, 2019).
Fielding et al. "Hypertext Transfer Protocol (HTTP/1.1): Semantics and Content", Internet Engineering Taskforce (IETF) Request for Comments: 7231, IEFT RFC 7231, pp. 1-102 (Jun. 2014).
Abley et al., "A Mechanism for Remote-Triggered DNS Cache Flushes (DNS FLUSH)," Network Working Group, Google, pp. 1-12 (Jun. 24, 2013).
Nichols et al., "Definition of the Differentiated Services Field (DS Field) in the IPv4 and IPv6 Headers," Internet Engineering Task Force (IEFT) Netwok Working Group Request for Comments (RFC) 2474, the Internet Society, pp. 1-20 (Dec. 1998).
3rd Generation Partnership Project; Technical Specification Group Services and System Aspects; Architecture enhancements to facilitate communications.
"Diameter and Diameter Applications," Alcatel-Lucent, http://infodoc.alcatel-lucent.com/html/0_add-h-f/93-0098-HTML/7750_SR_OS_Triple_Play_Guide/GX-PolicyMgmt.html, pp. 1-40 (Aug. 22, 2019).
"CPS vDRA Configuration Guide," Release 18.3.0 (Restricted Release)(1), Cisco, pp. 1-130 (Sep. 14, 2018).
"How To Do Rate Limiting of Diameter Messages Using NetScaler," Citrix Systems Inc., pp. 1-3 (Sep. 4, 2018).
"Multi-Layer Security Protection for Signaling Networks," Oracle Communications, Oracle white paper pp. 1-9 (Jan. 2016).
Fajardo et al., "Diameter Based Protocol," Internet Engineering Task Force (IETF) Request for Comments: 6733, pp. 1-152 (Oct. 2012).
Non-Final Office Action for U.S. Appl. No. 16/176,920 (dated Mar. 6, 2020).
Notification of Transmittal of the International Search Report and the Written Opinion of the International Searching Authority, or the Declaration for International Application Serial No. PCT/US2019/053912 (dated Dec. 18, 2019).
"3rd Generation Partnership Project; Technical Specification Group Radio Access Network; NG-RAN; NG Application Protocol (NGAP) (Release 15)," 3GPP TS 38.413, V15.4.0, pp. 1-328 (Jul. 2019).
Commonly-assigned, co-pending U.S. Appl. No. 16/453,955 for "Methods, Systems, and Computer Readable Media for Producer Network Function (NF) Service Instance Wide Egress Rate Limiting at Service Communication Proxy (SCP)," (Unpublished, filed Jun. 26, 2019).
"3rd Generation Partnership Project; Technical Specification Group Core Network and Terminals; 5G System; Network Function Repository Services; Stage 3 (Release 16)," 3GPP TS 29.510, V16.0.0, pp. 1-135 (Jun. 2019).
"3rd Generation Partnership Project; Technical Specification Group Core Network and Terminals; 5G System; Restoration Procedures (Release 16)," 3GPP TS 23.527, V16.0.0, pp. 1-19 (Jun. 2019).
"3rd Generation Partnership Project; Technical Specification Group Core Network and Terminals; Numbering, addressing and identification (Release 15)," 3GPP TS 23.003, V15.7.0, pp. 1-131 (Jun. 2019).
"Class of Service Feature Guide (Routers and EX9200 Switches)," Junos® OS, Juniper Networks, pp. 1-1530 (Apr. 10, 2019).
"3rd Generation Partnership Project; Technical Specification Group Services and System Aspects; System Architecture and 5G; Stage 2 (Release 16)," 3GPP TS 23.501, V16.0.0, pp. 1-318 (Mar. 2019).
Commonly-assigned, co-pending U.S. Appl. No. 16/369,691 for "Methods, System, and Computer Readable Media for Handling Multiple Versions of Same Service Provided by Producer Network Functions (NFs)," (Unpublished, filed Mar. 29, 2019).
Penttinen, "5G Explained: Security and Deployment of Advanced Mobile Communications," Chapter 6, Section 6.3.8 NRF, 2 pages (Feb. 2019).
"Oracle Communications Diameter Signaling Router," Release Notice, Release 8.3, E93179 Revision 02, Oracle, pp. 1-98 (Dec. 2018).
"3rd Generation Partnership Project; Technical Specification Group Network and Terminals; 5G Systems; Network Function Repository Services; Stage 3 (Release 15)," 3GPP TS 29.510, V15.2.0, pp. 1-113 (Dec. 2018).
"3rd Generation Partnership Project; Technical Specification Group Network and Terminals; 5G Systems; Principles and Guidelines for Services Definition; Stage 3 (Release 15)," 3GPP TS 29.501, V15.2.0, pp. 1-66 (Dec. 2018).
"3rd Generation Partnership Project; Technical Specification Group Services and System Aspects; Study on Enhancements to the Service-Based Architecture (Release 16)," 3GPP TR 23.742, V16.0.0, pp. 1-131 (Dec. 2018).
Commonly-assigned, co-pending U.S. Appl. No. 16/176,920 for "Methods, Systems, and Computer Readable Media for Providing a Service Proxy Function in a Telecommunications Network Core Using a Service-Based Architecture," (Unpublished, filed Oct. 31, 2018).
"Addressing 5G Network Function Requirements," Intel® FPGAs and Intel PAC 5G QoS and IPSec Benchmarking, White Paper, pp. 1-8 (Oct. 2018).
"5G; 5G System; Technical Realization of Service Based Architecture; Stage 3 (3GPP TS 29.500 version 15.0.0 Release 15)," ETSI TS 129 500, V15.0.0, pp. 1-29 (Jul. 2018).
"3rd Generation Partnership Project; Technical Specification Group Services and System Aspects; Study on Enhancements to the Service-Based Architecture (Release 16)," 3GPP TR 23.742, V0.3.0, pp. 1-64 (Jul. 2018).
"3rd Generation Partnership Project; Technical Specification Group Services and System Aspects; Study on Enhancements to the Service-Based Architecture (Release 16)," 3GPP TR 23.742, V0.2.0, pp. 1-39 (Jun. 2018).
"5G; Procedures for the 5G System (3GPP TS 23.502 version 15.2.0 Release 15)," ETSI TS 123 502 V15.2.0, pp. 1-46 (Jun. 2018).
"Cisco Ultra 5G Packet Core Solution," Cisco, White paper, https://www.cisco.com/c/dam/en/us/products/collateral/routers/network-convergence-system-500-series-routers/white-paper-c11-740360.pdf, pp. 1-11 (2018).
Scholl et al., "An API First Approach to Microservices Development," Oracle, https://blogs.oracle.com/developers/an-api-first-approach-to-microservices-development, pp. 1-12 (Nov. 8, 2017).
Brown et al., "Service-Based Architecture for 5G Core Networks," Huawei, Heavy Reading, https://www.3g4g.co.uk/5G/5Gtech_6004_2017_11_Service-Based-Architecture-for-5G-Core-Networks_HR_Huawei.pdf, pp. 1-12 (Nov. 2017).

(56) References Cited

OTHER PUBLICATIONS

"3rd Generation Partnership Project; Technical Specification Group Services and System Aspects; System Architecture for the 5G System; Stage 2 (Release 15)," 3GPP TS 23.501, V1.5.0, pp. 1-170 (Nov. 2017).

"Pseudo-CR on Service Discovery and Registration using NRF service," Ericsson, 3GPP TSG CT4 Meeting #79, 3GPP TR 29.891-v0.3.0, pp. 1-4 (Aug. 21-25, 2017).

Carlton et al., "HTTP and DNS in a 5G World," https://www.computerworld.com/article/3204594/http-and-dns-in-a-5g-world.html, pp. 1-5 (Jun. 30, 2017).

Benacer et al., "A High-Speed Traffic Manager Architecture for Flow-Based Networking," pp. 1-4 (2017).

"Dynamically Reconfigurable Optical-Wireless Backhaul/Fronthaul with Cognitive Control Plane for Small Cells and Cloud-RANs: D3.1 Analysis of state of the art on scalable control plane design and techniques for user mobility awareness. Definition of 5G-XHaul control plane requirements," European Commission, 5G-XHaul, pp. 1-107 (Jun. 31, 2016).

Kantola et al., "Policy-based communications for 5G mobile with customer edge switching," Security and Communication Networks, vol. 9, pp. 3070-3082 (2016).

Gulbrandsen et al, "A DNS RR for specifying the location of services (DNS SRV)," RFC 2782, pp. 1-12 (Feb. 2000).

Applicant-Initiated Interview Summary for U.S. Appl. No. 16/176,920 (Apr. 1, 2020).

Advisory Action for U.S. Appl. No. 16/356,446 (dated Dec. 22, 2020).

Commonly-assigned, co-pending U.S. Continuation-in-Part U.S. Appl. No. 17/102,404 for "Methods, Systems, and Computer Readable Media for Policing Access Point Name-Aggregate Maximum Bit Rate (APN-AMBR) Across Packet Data Network Gateway Data Plane (P-GW DP) Worker Instances," (Unpublished, filed Nov. 23, 2020).

Commonly-assigned, co-pending U.S. Appl. No. 17/082,871 for "Methods, Systems, and Computer Readable Media for Rank Processing for Network Function Selection," (Unpublished, filed Oct. 28, 2020).

"P-GW Administration Guide, StarOS Release 21.20," Cisco, pp. 1-1164 (Oct. 11, 2020).

"3rd Generation Partnership Project; Technical Specification Group Core Network and Terminals; Non-Access-Stratum (NAS) protocol for Evolved Packet System (EPS); Stage 3 (Release 17)," 3GPP TS 24.301, V17.0.0, pp. 1-585 (Sep. 2020).

3rd Generation Partnership Project; Technical Specification Group Services and System Aspects; Architecture enhancements to facilitate communications with packet data networks and applications (Release 16), 3GPP TS 23.682, V16.8.0, pp. 1-135 (Sep. 2020).

Commonly-assigned, co-pending U.S. Appl. No. 16/945,794 for "Methods, Systems, And Computer Readable Media For Preferred Network Function (NF) Location Routing Using Service Communications Proxy (SCP)," (Unpublished, filed Jul. 31, 2020).

"3rd Generation Partnership Project; Technical Specification Group Core Network and Terminals; 5G System; Network Function Repository Services; Stage 3 (Release 16)," 3GPP TS 29.510 V16.4.0, pp. 1-206 (Jul. 2020).

"3rd Generation Partnership Project; Technical Specification Group Services and System Aspects; Procedures for the 5G System (5GS); Stage 2 (Release 16)," 3GPP TS 23.502 V16.4.0, pp. 1-582 (Mar. 2020).

"3rd Generation Partnership Project; Technical Specification Group Services and System Aspects; System architecture for the 5G System (5GS); Stage 2 (Release 16)," 3GPP TS 23.501 V16.4.0, pp. 1-430 (Mar. 2020).

Commonly-assigned, co-pending U.S. Continuation-in-Part U.S. Appl. No. 17/074,553 for "Methods, Systems, and Computer Readable Media for Actively Discovering and Tracking Addresses Associated with 4G Service Endpoints," (Unpublished, filed Oct. 19, 2020).

Li et al., "Mobile Edge Computing Platform Deployment in 4G LTE Networks: A Middlebox Approach," https://www.usenix.org/system/files/conference/hotedge18/hotedge18-papers-li.pdf, 6 pages (2018).

"3rd Generation Partnership Project; Technical Specification Group Core Network and Terminals; Domain Name System Procedures; Stage 3 (Release 13)," 3GPP TS 29.303 V13.4.0, pp. 1-69 (Jun. 2016).

"LTE and Beyond," https://ytd2525.wordpress.com/2013/03/06/lte-and-beyond/, 3 pages (2013).

Notice of Allowance and Fee(s) Due for U.S. Appl. No. 16/555,817 (Dec. 3, 2020).

Notice of Allowance and Fee(s) Due for U.S. Appl. No. 17/001,599 (dated May 17, 2021).

Applicant-Initiated Interview Summary for U.S. Appl. No. 17/001,599 (dated May 5, 2021).

Notification of Transmittal of the International Search Report and the Written Opinion of the International Searching Authority, or the Declaration for International Application Serial No. PCT/US2020/065765 (dated Apr. 15, 2021).

Ex Pane Quayle Action for U.S. Appl. No. 16/730,799 (dated Apr. 7, 2021).

Notice of Allowance and Fee(s) Due for U.S. Appl. No. 16/555,817 (dated Mar. 24, 2021).

International Search Report and Written Opinion for Patent Cooperation Treaty Application U.S. Appl. No. PCT/US2020/061885 (dated Feb. 4, 2021).

International Search Report and Written Opinion for Patent Cooperation Treaty Application U.S. Appl. No. PCT/US2020/057712 (dated Feb. 2, 2021).

Cheshire, S. et al., "Apple's DNS Long-Lived Queries protocol draft-sekar-dns-llq-06," Internet Engineering Task Force (IETF), pp. 1-26 (Aug. 23, 2019).

Commonly-assigned, co-pending U.S. Appl. No. 17/156,149 for "Methods, Systems, and Computer Readable Media for Optimized Routing of Messages Relating to Existing Network Function (NF) Subscriptions Using an Intermediate Forwarding NF Repository Function (NRF)," (Unpublished, filed Nov. 9, 2020).

Commonly-assigned, co-pending U.S. Appl. No. 17/102,404 for "Methods, Systems, and Computer Readable Media for Policing Access Point Name-Aggregate Maximum Bit Rate (APN-AMBR) Across Packet Data Network Gateway Data Plane (P-GW DP) Worker Instances," (Filed Sep. 23, 2020).

"5G; System architecture for the 5G System (5GS) (3GPP TS 23.501 version 15.6.0 Release 15)," ETSI TS 123 501, V15.6.0, pp. 1-168 (Oct. 2019).

"5G; 5G System; Network function repository services; Stage 3 (3GPP TS 29.510 version 15.5.1 Release 15)," ETSI TS 129 510, V15.5.1, pp. 1-132 (Oct. 2019).

"5G; 5G System; Technical Realization of Service Based Architecture; Stage 3 (3GPP TS 29.500 version 15.5.0 Release 15)," ETSI TS 129 500, V15.5.0, pp. 1-40 (Sep. 2019).

* cited by examiner

METHODS, SYSTEMS, AND COMPUTER READABLE MEDIA FOR DIAMETER-PEER-WIDE EGRESS RATE LIMITING AT DIAMETER RELAY AGENT (DRA)

PRIORITY CLAIM

This application is a continuation-in-part of U.S. patent application Ser. No. 16/453,955 filed on Jun. 26, 2019, the disclosure of which is incorporated herein by reference in its entirety.

TECHNICAL FIELD

The subject matter described herein relates to performing rate limiting of network service requests to Diameter peers. More particularly, the subject matter described herein relates to methods, systems, and computer readable media for Diameter-peer-wide egress rate limiting at a Diameter relay agent.

BACKGROUND

In Diameter networks, Diameter peers provide services to Diameter-based service consumers. Examples of Diameter peers that provide services are the home subscriber server (HSS), the policy and charging rules function (PCRF), the service capabilities exposure function (SCEF), and service capability server/application server (SCS/AS). Examples of Diameter nodes that consume services provided by the upstream Diameter peers are the mobility management entity (MME), the mobile switching center (MSC), the serving general packet radio service support node (SGSN), and the short message service center (SMSC).

The node that relays messages between upstream Diameter peers that provide services and downstream Diameter peers that consume services is the Diameter relay agent (DRA). Upstream Diameter peers may have multiple service endpoints, where a service endpoint is defined by a combination of Internet protocol (IP) address and port number. The DRA may have Diameter connections with an upstream Diameter peer via the service endpoints. The DRA may select connections with service endpoints on upstream Diameter peers and may send service requests to the upstream Diameter peers over the connections.

One problem with existing processes used to service endpoints on Diameter peers to handle service requests is that Diameter peer selection decisions may be made by individual entities within the DRA that are not aware of upstream Diameter peer processing capacity based on service requests routed to the upstream Diameter peer from other entities. For example, upstream Diameter peers may receive service requests from DRA entities that are not aware of the capacity of the upstream Diameter peers or of the amount of that capacity used by other DRA entities. As a result, an upstream Diameter peer can become overwhelmed with service requests from one DRA entity that is not aware of service requests sent to the upstream Diameter peer from another DRA entity.

Accordingly, in light of these difficulties, there exists a need to methods, systems, and computer readable media for Diameter-peer-wide egress rate limiting at a Diameter relay agent.

SUMMARY

The subject matter described herein includes methods, systems, and computer readable media for Diameter-peer-wide egress rate limiting. One method includes steps performed at a Diameter relay agent (DRA) including at least one processor. The steps include receiving service requests from Diameter-based consumers. The steps further include forwarding the service requests to DRA worker instances. The steps further include, at the DRA worker instances, requesting, from a rate limiting policer separate from the DRA worker instances, Diameter peer capacity for handling the service requests. The method also includes steps performed at the rate limiting policer. The steps include performing Diameter-peer-wide egress rate limiting between the DRA worker instances and Diameter peers by granting or denying requests for Diameter peer capacity from the DRA worker instances such that combined egress traffic from the DRA worker instances does not exceed rate capacities of the Diameter peers.

According to one aspect of the subject matter described herein, requesting Diameter peer capacity from the rate limiting policer includes requesting an allocation of tokens from the rate limiting policer, where the tokens are usable by the DRA worker instances to determine whether to grant or deny the service requests.

According to one aspect of the subject matter described herein, performing Diameter-peer-wide rate limiting includes accessing a database for determining amounts of available tokens for each of the Diameter peers.

According to another aspect of the subject matter described herein, requesting an allocation of tokens includes requesting the allocation of tokens in response to a percentage of granted tokens available to one of the DRA worker instances being less than a threshold amount.

According to yet another aspect of the subject matter described herein, the rate limiting policer maintains, for each of the Diameter peers, a maximum limit of tokens that can be allocated a time interval and grants or denies the requests for allocation of tokens based on whether a number of tokens requested by the requests for allocation of tokens would cause the maximum limit of tokens to be exceeded.

According to yet another aspect of the subject matter described herein, performing Diameter-peer-wide egress rate limiting includes implementing a fixed window during which tokens can be granted.

According to yet another aspect of the subject matter described herein, performing the Diameter-peer-wide egress rate limiting includes implementing a sliding window during which tokens can be granted.

According to yet another aspect of the subject matter described herein, performing Diameter-peer-wide rate limiting policing includes implementing best effort allocation wherein if a number of tokens requested by one of the DRA worker instances during a time interval would cause the maximum allocated tokens during a time interval to be exceeded, granting a remainder tokens available in the time interval that would not cause the maximum limit of tokens to be exceeded.

According to yet another aspect of the subject matter described herein, performing Diameter-peer-wide egress rate limiting includes implementing max limit token allocation by denying a request for allocation of tokens if a requested number of tokens would cause the maximum limit of tokens to be exceeded.

According to yet another aspect of the subject matter described herein, the DRA provides Diameter relay and routing services.

According to yet another aspect of the subject matter described herein, a system for Diameter-peer-wide egress rate limiting is provided. The system includes a Diameter relay agent (DRA) including at least one processor for receiving service requests from Diameter-based consumers, forwarding the service requests to DRA worker instances implemented by the DRA, and requesting, by the DRA worker instances, Diameter peer capacity for handling the service requests. The system further includes a rate limiting policer for performing Diameter-peer-wide egress rate limiting between the DRA worker instances and Diameter peer instances by granting or denying requests for Diameter peer capacity from the DRA worker instances such that combined egress traffic from the DRA worker instances does not exceed rate capacities of the Diameter peers.

According to yet another aspect of the subject matter described herein, the DRA worker instances are configured to request Diameter peer capacity from the rate limiting policer by requesting an allocation of tokens from the rate limiting policer, where the tokens are usable by the DRA worker instances to determine whether to grant or deny the service requests.

According to yet another aspect of the subject matter described herein, the system includes a database accessible by the rate limiting policer for determining amounts of available tokens for each of the Diameter peers.

According to yet another aspect of the subject matter described herein, the DRA worker instances are configured to request an allocation of tokens in response to a number of granted tokens available to one of the DRA worker instances being less than a threshold value.

According to yet another aspect of the subject matter described herein, the rate limiting policer is configured to maintain, for each of the Diameter peers, a maximum limit of tokens that can be allocated a time interval and to grant or deny the requests for allocation of tokens based on whether a number of tokens requested by the requests for allocation of tokens would cause the maximum limit of tokens to be exceeded.

According to yet another aspect of the subject matter described herein, the rate limiting policer is configured to perform Diameter-peer-wide egress rate limiting by implementing a fixed window during which tokens can be granted.

According to yet another aspect of the subject matter described herein, the rate limiting policer is configured to perform the Diameter-peer-wide egress rate limiting by implementing a sliding window during which tokens can be granted.

According to yet another aspect of the subject matter described herein, the rate limiting policer is configured to performing the Diameter-peer-wide rate limiting policing by implementing best effort allocation wherein if a number of tokens requested by one of the DRA worker instances during a time interval would cause the maximum allocated tokens during a time interval to be exceeded, granting a remainder tokens available in the time interval that would not cause the maximum limit of tokens to be exceeded.

According to yet another aspect of the subject matter described herein, the rate limiting policer is configured to performing Diameter-peer-wide egress rate limiting by implementing max limit token allocation, which includes denying a request for allocation of tokens if a requested number of tokens would cause the maximum limit of tokens to be exceeded.

According to yet another aspect of the subject matter described herein, a non-transitory computer readable medium having stored thereon executable instructions that when executed by the processor of a computer control the computer to perform steps is provided. The steps include a first set performed at a service communication (DRA) including at least one processor. The first set of steps include receiving service requests from Diameter-based consumers, forwarding the service requests to DRA worker instances, and at the DRA worker instances, requesting, from a rate limiting policer separate from the DRA worker instances, Diameter peer capacity for handling the service requests. The steps further include a second set performed at the rate limiting policer. The second set of steps include performing Diameter-peer-wide egress rate limiting between the DRA worker instances and Diameter peer instances by granting or denying requests for Diameter peer capacity from the DRA worker instances such that combined egress traffic from the DRA worker instances does not exceed rate capacities of the Diameter peers.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
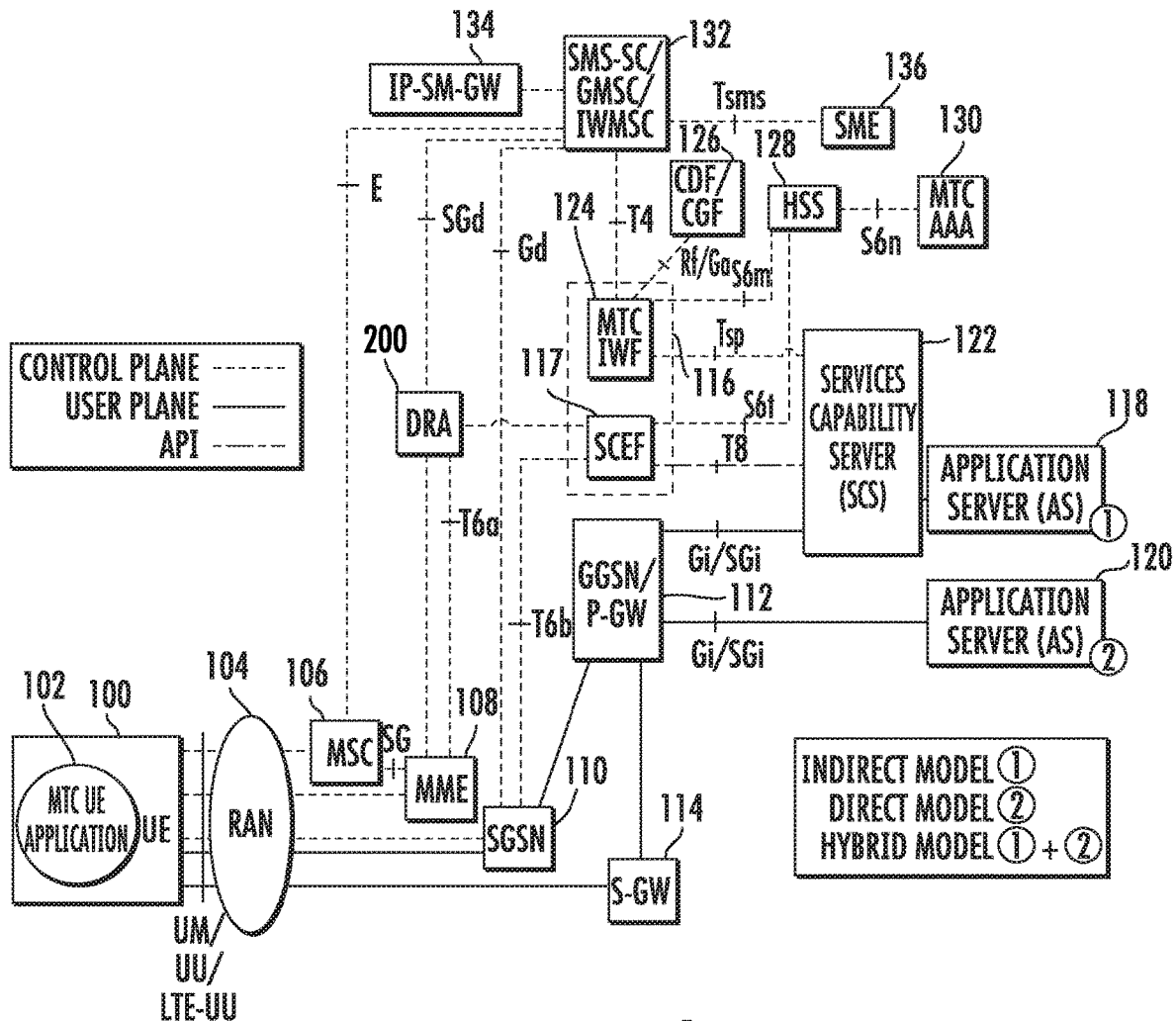
FIG. 1 is a network diagram illustrating an exemplary network architecture including Diameter-based consumers, Diameter peers, and a DRA.

The subject matter described herein relates to methods, systems, and computer readable media for Diameter-peer-wide egress rate limiting at a Diameter relay agent. As stated above, one problem with existing network architectures is that upstream Diameter peers that provide services can become overwhelmed with traffic from multiple different DRA entities that send service requests to the upstream Diameter peers. To solve this problem without unduly complicating the DRA architecture, a rate limiting policer separate from the DRA may implement rate limiting policing of service requests to upstream Diameter peers. In order to more fully explain rate limiting policing, a background on the Diameter network architecture will first be presented. FIG. 1 is a block diagram illustrating an Diameter network architecture. The architecture in FIG. 1 includes FIG. 1 is a network diagram illustrating an exemplary 3GPP-defined network architecture. The architecture illustrated in FIG. 1 is defined in 3GPP TS 23.682, Technical Specification Group Services and System Aspects;

Architecture enhancements to facilitate communications with packet data networks and applications (Release 16), V16.3.0 (2019-06), the disclosure of which is incorporated herein by reference in its entirety. In FIG. 1, the architecture includes user equipment (UEs) 100, which may include machine type communications (MTC) UE applications 102. Thus, UE 100 may be an IoT device, such as a sensor.

UE 100 connects to the core network via radio access network (RAN) 104. RAN 104 may be the evolved universal terrestrial radio access network (E-UTRAN), the new radio (NR) network, or a combination thereof. The node in radio access network 104 that provides radio connectivity to 2G and 3G UE devices is referred to as the base station. For 4G UEs, the node in radio access network 104 that provides radio network connectivity to the UEs is referred to as the evolved node B (eNB). For 5G-capable UEs, the node that provides NR connectivity to the devices is referred to as the gNode B (gNB). RAN 104 is intended to represent one or more base stations, eNBs, and gNBs.

Mobile switching center (MSC) 106 performs mobility management functions for 2G and 3G UE devices. Mobility management entity (MME) 108 performs mobility management functions for 4G capable UE devices. Mobility management functions performed by MSC 106 or MME 108 may include receiving mobile device registrations, communicating mobile subscriber registration and location information to home location register (HLR) or home subscriber service (HSS), and communicating with the nodes in RAN 104 with which UEs are attached to the network.

Serving general packet radio service support node (SGSN) 110 handles packet data communications with mobile users in the network. SGSN 110 functions as the service access point to the GPRS network for the mobile user.

On the other side, SGSN 110 communicates with gateway GPRS support node/packet gateway (GGSN/PGW) 112, which can function as the policy enforcement point for packet data communications with mobile users. A policy and charging rules function (PCRF) (not shown in FIG. 1) may perform policy and charging functions for mobile users. The PCRF may include a policy data store that stores policies to be applied to mobile users. The policies may be installed in a policy enforcement point, such as GGSN/PGW 112 to enforce policies for network usage and charging. A signaling gateway (SGW) 114 performs signaling protocol conversions to set up bearer communications with mobile users.

SCEF 116 includes a SCEF function 117 and a machine type communications interworking function (MTC-IWF) 124. SCEF function 117, on the application side, provides an interface for application servers, such as application servers (aSs) 118 and 120 and service capability server (SCS) 122 to communicate with the network. SCEF 116, in one example, is the node that supports group triggering of IoT devices by application servers 118 and 120 and by service capability server 122. In a direct communication model, application servers 118 and 120 may communicate directly with GGSN/PGW 112. In an indirect communication model, application servers 118 and 120 may communicate with the network via SCS 122 and SCEF 116. It should also be noted that application servers 118 and 120 may communicate directly with SCEF 116.

MTC-IWF 124 facilitates communication with IoT devices that do not have IP communications capabilities. A charging data function/charging gateway function (CDF/CGF) 126 generates billing records for network usage. A home subscriber server (HSS) 128 stores subscription and location information for UE devices. In one example, HSS 128 may also be configured with mappings used by SCEF 116 or another node to translate an external group ID into individual IoT device identifiers, such as international mobile subscriber identifiers (IMSIs). A machine type communications authentication authorization and accounting (MTC AAA) server 130 performs AAA functions for MTC devices.

The network architecture may include a short message service center/gateway message service center/interworking message service center (SMSC/GMSC/IWMSC) 132 for generating and delivering SMS messages to IoT devices. An IP short message gateway (IP-SM-GW) 134 may convert IP messages to SMS messages and vice versa. A short message entity (SME) 136 sends and receives SMS messages.

A Diameter relay agent 200 may be located on any one or more of the interfaces illustrated in FIG. 1 to relay Diameter messages between Diameter service consumers and upstream Diameter peers that provide services to the Diameter service consumers. In the illustrated example, DRA 200 is located on the T6a interface between MME 108 and SCEF 116 and the SGd interface between MME 108 and SMS-SC/GMSC/IWMSC 132. However, it is understood that DRA 200 can be located on any Diameter interface to relay Diameter messages between Diameter peers.

The subject matter described herein includes a DRA that resides between Diameter service consumers and upstream Diameter peers that provide service. The DRA may perform Diameter relay agent functions, as defined in IETF RFC 6733, Diameter Base Protocol (December 2012), the disclosure of which is incorporated herein by reference in its entirety. Such functions may include relaying or routing Diameter messages between Diameter-based service consumers and upstream Diameter peers that provide services and load balancing Diameter messages between Diameter service consumers and Diameter service producers. The DRA may also perform Diameter redirect and proxy agent services as defined in IETF RFC 6733.

Figure 2:
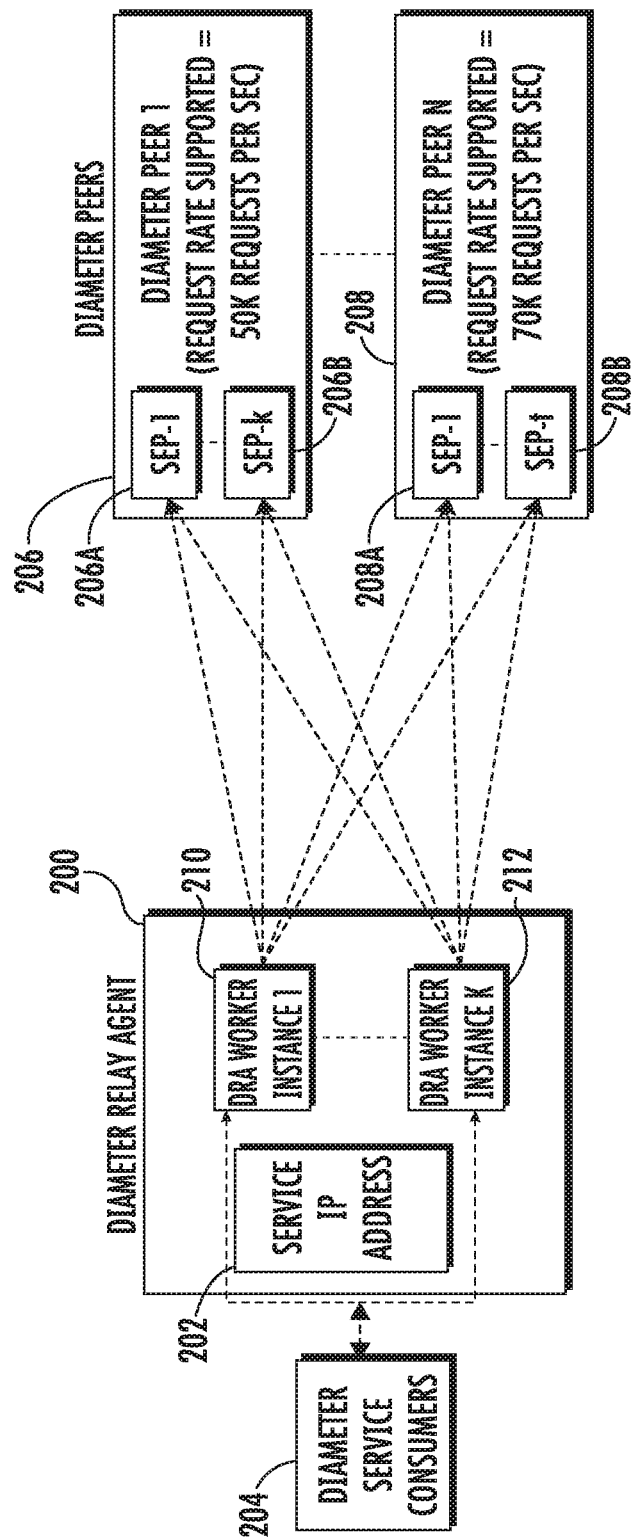
FIG. 2 is a network diagram illustrating the forwarding of service requests from DRA worker instances to Diameter peers without egress rate limiting of requests from the DRA worker instances to the Diameter peer server instances.

FIG. 2 is a network diagram illustrating an exemplary architecture where the Diameter relay agent resides between the Diameter-based service consumers and Diameter service producers. In FIG. 2, Diameter relay agent 200 provides a service IP address 202 to which Diameter-based consumers 204 connect to receive service from Diameter peers 206 and

208. DRA 200 forwards requests from Diameter-based consumers 204 to Diameter peers 206 and 208 and routes responses from Diameter peers 206 and 208 to Diameter-based consumers 204. DRA 200 includes DRA worker instances 210 and 212 that are deployed in a scalable manner such that ingress service requests from Diameter-based consumers 204 are load balanced among DRA worker instances 210 and 212. Each DRA worker instance 210 and 212 is connected to all of the Diameter peers 206 and 208 for redundancy and load distribution purposes. In the illustrated example, DRA worker instance 210 initiates Diameter service connections with Diameter peer 206 and Diameter peer 208 via service endpoints 206A, 206B, 208A, and 208B, respectively. Similarly, DRA worker instance 212 establishes Diameter service connections with Diameter peers 206 and 208 via service endpoints 206A, 206B, 208A, and 208B, respectively. Each of service endpoints 206A, 206B, 208A, and 208B may be service access points advertised by Diameter peers 206 and 208.

DRA 200 may be implemented using a computing platform including at least one processor and a memory. The computing platform may be configured for on-premises deployment in a facility managed by a network service provider or for cloud network deployment. In a cloud deployment, DRA may be offered as a cloud service to network service providers. In one exemplary implementation, DRA 200 may include a plurality of message processors, where each message processor includes a printed circuit board with at least one processor and a memory mounted on the printed circuit board. The message processors each implement a Diameter function. For example, DRA worker instances 210 and 212 may each be implemented on a message processor to relay Diameter service requests from Diameter consumers to Diameter peers and may relay Diameter responses from the Diameter peers to the Diameter consumers.

Figure 3:
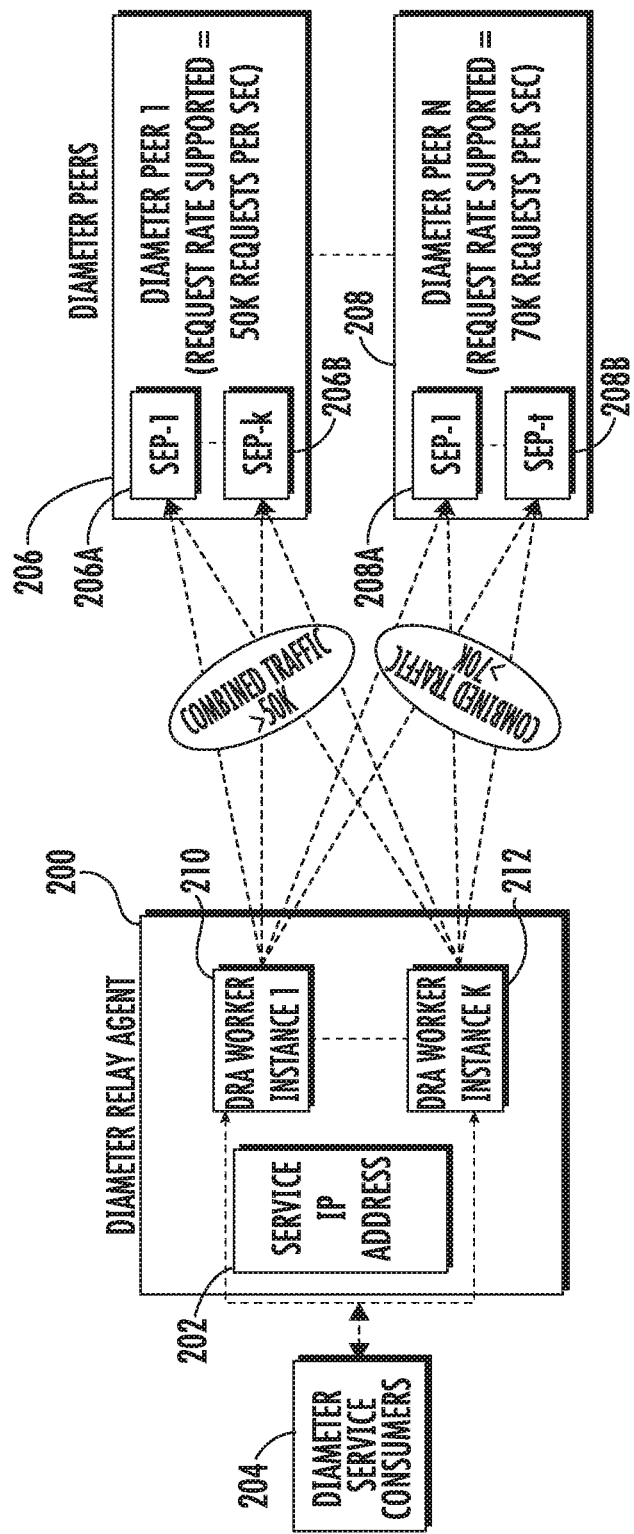
FIG. 3 is a network diagram illustrating the forwarding of requests from the DRA to Diameter peers where the capacities of the Diameter peers are exceeded by requests from different DRA worker instances.

FIG. 3 is a network diagram illustrating problems that can occur with the architecture illustrated in FIG. 2 without egress rate policing for service requests generated by DRA 200 to the Diameter peers. Diameter peers 206 and 208 may publish their rate capacities to DRA 200. In FIG. 3, Diameter peer 206 has a published rate capacity of 50,000 requests per second. Diameter peer 208 has a published rate capacity of 70,000 requests per second. The rate capacities define a number of new service requests that each Diameter peer can handle in a time period. Even though DRA 200 is aware of the rate capacity of each Diameter peer, because DRA 200 uses multiple DRA worker instances to send service requests to Diameter peers 206 and 208, and the DRA worker instances are not aware of service requests sent by other DRA worker instances, the rate capacity of Diameter peers 206 and 208 can be exceeded for a given time interval.

In order to avoid this problem, rate limiting should be applied on a per Diameter peer basis so that Diameter peers are protected against receiving traffic from independent entities that exceeds the capacities of the Diameter peers. Challenges with the architecture illustrated in FIG. 3 include the fact that multiple DRA worker instances can connect and route messages to the same Diameter peer, and the DRA worker instances are unaware of the transmission rates of other DRA worker instances. As a result, there is a high possibility of overloading the Diameter peers.

One possible solution to this problem is to provide a static allocation of capacities by each Diameter peer to the each of DRA worker instances. For example, Diameter peer 206 could statically allocate half of its total capacity to DRA worker instance 210 and the other half to DRA worker instance 212. One problem with this approach is that the capacity of Diameter peer 206 could be underutilized when incoming service requests are not evenly distributed among DRA worker instances 210 and 212. Another problem with requiring DRA worker instances to police their own egress traffic rates is that there can be multiple endpoints for Diameter peers and tracking rate limits per Diameter peer may unnecessarily complicate the DRA worker instance logic. Another problem with statically allocating Diameter peer capacity among DRA worker instances is that new DRA worker instances may be continually established, requiring re-allocation of static capacities among the new and pre-existing DRA worker instances.

Figure 4:
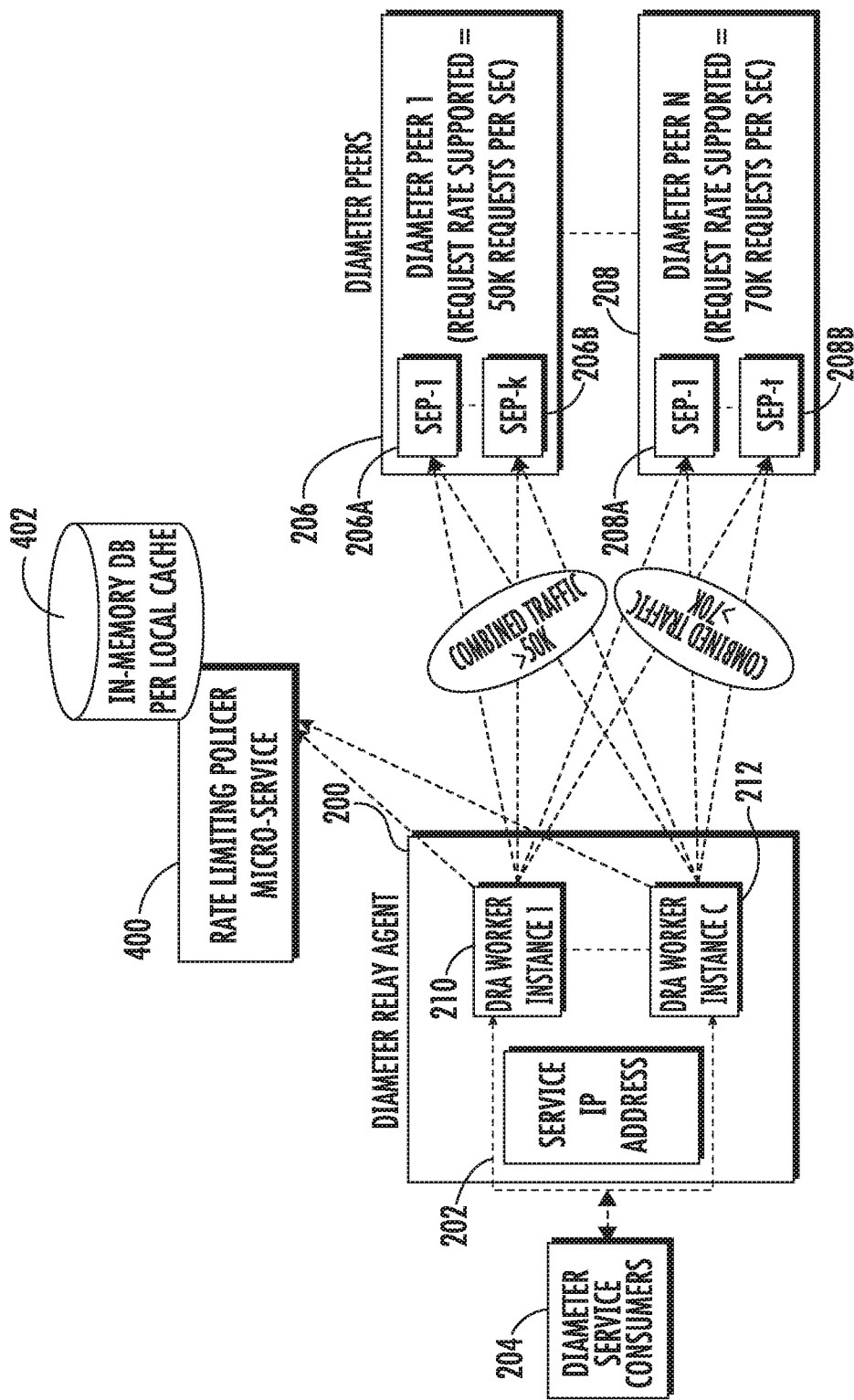
FIG. 4 is a network diagram illustrating egress rate limiting of traffic between DRA worker instances and Diameter peers.

FIG. 4 is a network diagram illustrating the architecture in FIG. 3 with a rate limiting policer 400 implemented as a microservice separate from the DRA worker instances to perform egress rate limiting on a per Diameter peer basis. In the illustrated example, rate limiting policer 400 includes an in-memory database or cache 402 that maintains total rate limit capacity per Diameter peer and controls allocations of the capacities among DRA worker instances 210 and 212. Rate limiting policer 400 may receive Diameter peer capacity information from the Diameter peers or from DRA 200, which receives the capacity information from the Diameter peers.

DRA worker instances 212 are entities that are instantiated by DRA 200 to handle service requests from Diameter-based consumers. In general, the functions of an DRA worker instance include receiving incoming service requests from Diameter-based consumers, selecting Diameter peers to handle the service requests (e.g., based on the type of service to be provided), requesting Diameter peer capacity from rate limiting policer 400, and forwarding or dropping the service requests depending on whether the Diameter peer capacity granted by the rate limiting policer is sufficient to handle the requests. Rate limiting policer 400 receives requests from DRA worker instances 210 and 212 for allocation of capacity of a given service. Rate limiting policer 400 allocates rate capacity slices to each DRA worker per Diameter peer using a token bucket algorithm, which will be described below. The available or used capacities of each Diameter peer 206 and 208 may be maintained in database 402 for fast access.

Rate limiting policer 400 may be implemented using a computing platform including at least one processor and a memory. The computing platform may be configured for on-premises deployment in a facility managed by a network service provider or for cloud network deployment. In a cloud deployment, rate limiting policer 400 may be offered as a cloud service to network service providers.

Using the architecture illustrated in FIG. 4, rate limiting logic at each DRA worker instance 210 and 212 is simplified because the DRA worker instances are not required to maintain used capacities of Diameter peers. Instead, each DRA worker instance 210 and 212 determines whether it has sufficient Diameter peer capacity granted by rate limiting policer 400 to process service requests from Diameter-based consumers 204. If an DRA worker instance does not have sufficient Diameter peer capacity, the worker requests additional capacity from rate limiting policer 400. If rate limiting policer 400 grants the capacity to an DRA worker instance, the DRA worker instance can accept the corresponding service requests and route the requests to the Diameter peer 206 or 208 according to the granted capacity. If the DRA worker instance is unable to obtain sufficient capacity to handle a new request, the DRA worker instance may drop traffic for the Diameter peer. In this manner, rate limiting is seamless to DRA worker instances, scaling up or scaling down.

Figure 5:
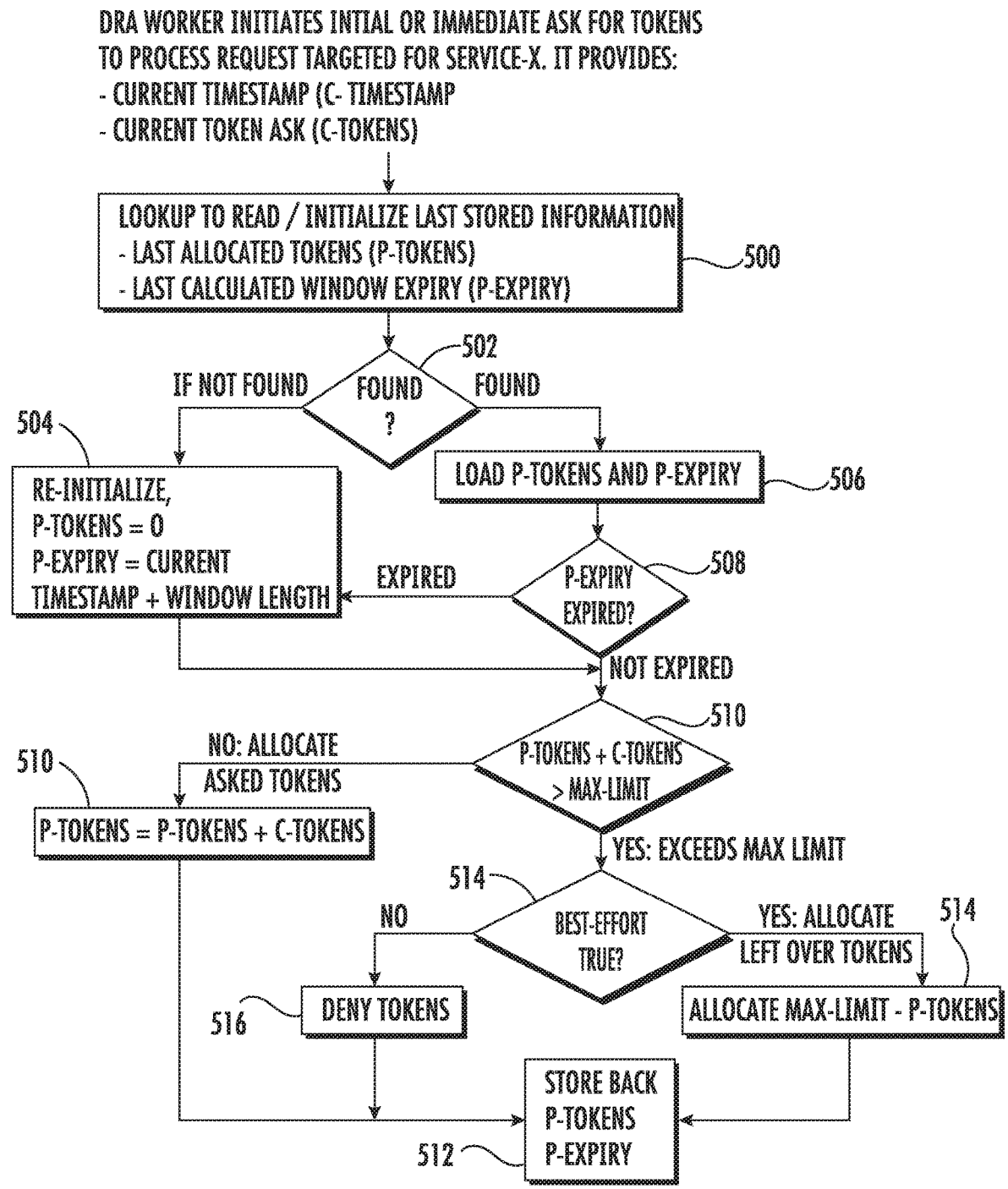
FIG. 5 is a flow chart illustrating an exemplary fixed window token bucket algorithm that may be implemented by the rate limiting policer in FIG. 4 to prevent Diameter peers from being overwhelmed with traffic from Diameter-based consumers.

As stated above, in one example, rate limiting policer 400 implements a token bucket algorithm for performing rate limiting policing on a per Diameter peer basis. The token bucket algorithm may be implemented for every Diameter peer 206 or 208 for every rate limiting window, where rate limiting window is a time period, such as 1 second, over which a rate limiting capacity of a Diameter peer can be defined using a number of tokens that can be granted during the window. An DRA worker instance may demand multiple tokens in a rate limiting window from rate limiting policer 400 (1 token for each pending request from a Diameter-based consumer). The algorithm for DRA worker instances will be described in detail below. Rate limiting policing may be implemented in two different algorithms. One algorithm uses a fixed window and another algorithm uses a sliding window. FIG. 5 illustrates the fixed window rate policing algorithm that may be implemented by rate limiting policer 400. The fixed window algorithm works with two different configurations. One configuration is max limit configuration where, if the number of requested tokens would cause the maximum limit capacity of the Diameter peer to be exceeded, the request is denied. Another configuration option is the best effort configuration option in which if the number of tokens requested in a given window exceed the number of available tokens, the available tokens can be allocated even though they do not completely satisfy the current request. For every token demand, rate limiting policer 400 returns the granted tokens as per the algorithm and the time remaining in the current window.

Referring to the flow chart in FIG. 5, an DRA worker may initially or intermittently request tokens for the Diameter peer that the DRA worker instance has selected to provide service for a given service request. The request for allocation of tokens may include the current timestamp and the current token ask (number of tokens requested). In step 500, rate limiting policer 400 receives the request for allocation of tokens and performs a lookup in database 402 to determine whether the request is a new request for the current time interval or whether tokens have already been allocated to the requester during the current time interval. In step 502, if a record is not found in the lookup, the request is a new request, and control proceeds to step 504 where we begin the first window of token allocation for Service-X. In here, the number of previously allocated tokens is set to zero because we have just created the window, and the previous expiry time is set to the current timestamp plus the window length, i.e., the expiry time of the created window. In step 502, if a record is found, then the request is a subsequent request for the same requester and control proceeds to step 506 where the previous allocated tokens and the previous expiry time are loaded.

In step 508, it is determined whether the P-Expiry timer has expired. The P-Expiry timer controls the expiration of previously allocated tokens. If the P-Expiry timer has expired, control proceeds to step 504 where the current request is processed like a new request. If the previous expiry time has not expired in step 508, control proceeds to step 510. In step 510 it is determined whether the previous number of allocated tokens plus the current number of requested tokens exceeds the maximum limit for the Diameter peer for the time interval. If the maximum limit is not exceeded, control proceeds to step 510 where the requested tokens are allocated and the variable P-Tokens (previous tokens) is set to be equal to current value of P-Tokens plus C-Tokens (currently requested tokens). In step 512, the values of P-Tokens and C-Tokens are stored in database 402. The DRA worker instance can then consume the tokens by sending service requests to the Diameter peer. In one implementation, one token allows the DRA worker instance to send one service request to a Diameter peer. After the DRA worker instances sends a service request to a Diameter peer service interest, the DRA worker instance decrements the number of available tokens.

Returning to step 510, if the previously allocated tokens plus the currently requested tokens for the time interval exceeds the maximum limit, control proceeds to step 512 where it is determined whether best effort allocation is implemented. As described above, best effort allocation allows tokens to be allocated even when the number of available tokens is not sufficient to satisfy the current request. If best effort allocation is not implemented, control proceeds to step 516 where the token demand is denied and then to 512 where the values of P-Tokens and P-Expiry are stored in database 402. If best effort allocation is implemented, control proceeds to step 514 where the leftover tokens are allocated. The number of tokens allocated is equal to the maximum limit minus the previously allocated tokens. Control then proceeds to step 512 where the values of P-Tokens and P-Expiry are stored in database 402.

FIG. 5 illustrates the fixed window token allocation algorithm implemented by egress rate limiting policer 400. As stated above, in another example, the token allocation algorithm may utilize a sliding window. In a sliding window approach, the initial and expiry time for a given token allocation window move in time. Tokens within a window are divided into buckets, and each bucket has a start time and a length. When the current timestamp passes the end of a bucket (bucket start time plus length), unused tokens within the bucket expire and can be reclaimed and used to satisfy requests for tokens from the same or other DRA worker instances. Using a sliding window thus increases the availability of unused tokens.

Figure 6:
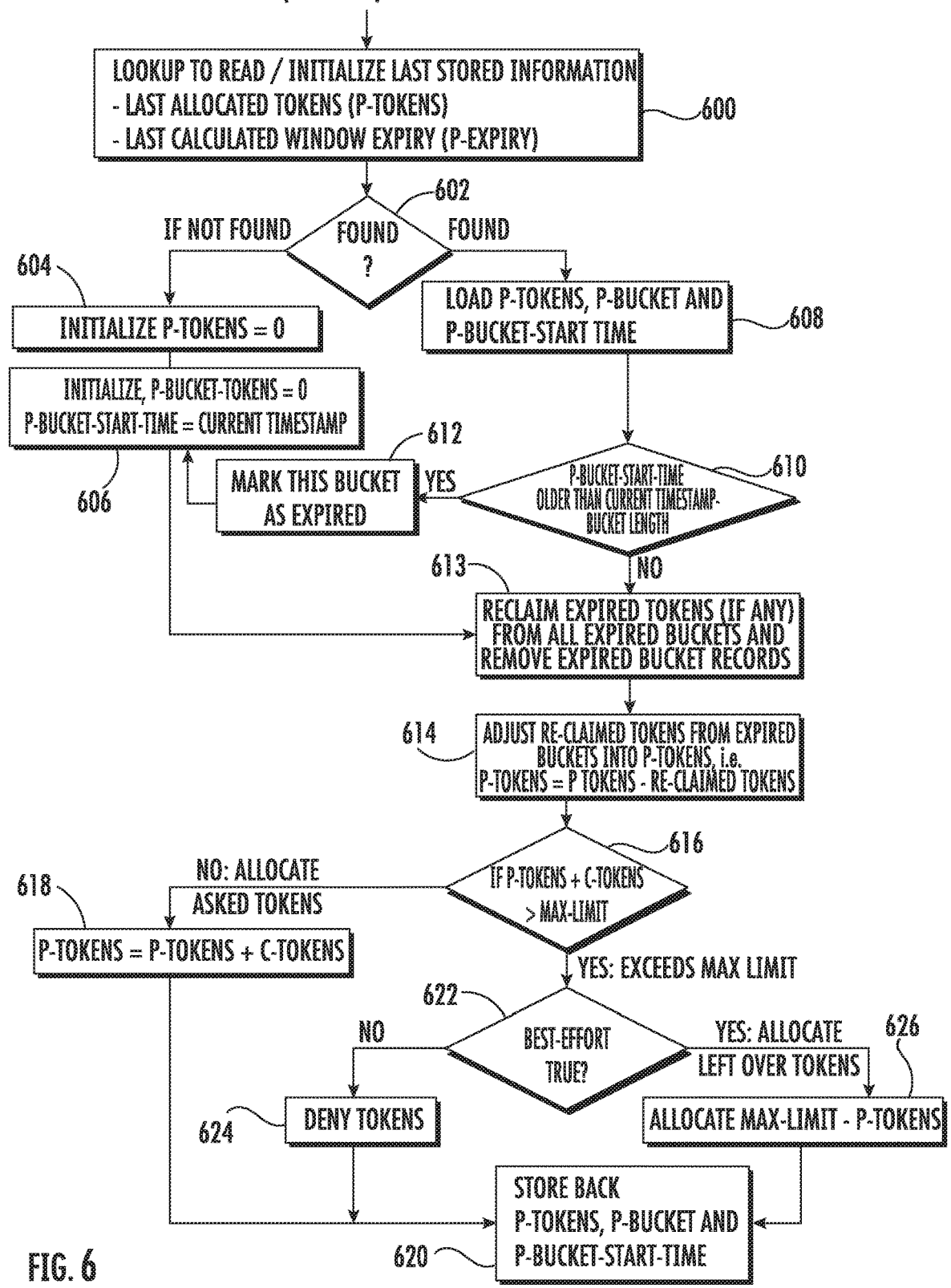
FIG. 6 is a flow chart illustrating a sliding window token bucket algorithm that may be implemented by a rate limiting policer to perform egress rate limiting of traffic to Diameter peers.

FIG. 6 is a flow chart illustrating an exemplary sliding window token bucket algorithm that may be implemented by rate limiting policer 400. Referring to FIG. 6, an DRA worker initiates or intermittently asks for tokens to process a request targeted for a service. The request specifies the current timestamp and the current number of tokens requested. In step 600, rate limiting policer 400 performs a lookup in database 402 to determine whether the request is a new request for the time interval or an existing request. If an entry is not located in the lookup, the request is a new request. Accordingly, control proceeds from step 602 to step 604 where the previously allocated tokens variable (P-Tokens) for the time interval is initialized to zero. Control then proceeds to step 606 where the variable P-Bucket-Tokens is set to zero and the variable P-Bucket-Start-Timestamp is set to the current timestamp.

In step 602, if an entry is found, then the request is a subsequent request for the current time interval. If the request is a subsequent request, control proceeds to step 608 where the previously allocated tokens (P-Tokens), the variable P-Bucket-Tokens, and the variable P-Bucket-Start-Time are initialized to the values located in the database. Control then proceeds to step 610 where it is determined whether the variable P-Bucket-Start-Time is older than the current timestamp minus the bucket length. If this is true, control proceeds to step 612 where the current bucket is marked as expired and then to step 606 where the variable P-tokens-bucket is set to zero and the variable P-Bucket-Start-Time is set to the current start time.

After step 610, control proceeds to step 613 where any expired tokens are reclaimed from expired buckets, and expired bucket records are removed. From step 613, control proceeds to step 614 where reclaimed tokens from expired buckets are adjusted into P-Tokens (i.e., P-Tokens=P-Tokens−reclaimed tokens). Control then proceeds to step 616 where it is determined whether the previously allocated tokens plus the current requested tokens is greater than the maximum limit. If the sum of the previously allocated tokens and the current tokens is not greater than the maximum limit, the tokens are allocated and control proceeds to step 618 where P-Tokens is set to the previously allocated tokens plus the currently requested tokens. Control then proceeds to step 620 where the values of the variables P-Tokens, P-Bucket-Tokens, and P-Bucket-Timestamp are stored in database 402.

Referring to step 616, if the sum of the previously allocated tokens and the currently requested tokens exceeds the maximum limit for the time interval, control proceeds to step 622 where it is determined whether best effort allocation is implemented. If best effort allocation is not implemented, control proceeds to step 624 where the request is denied. If best effort allocation is implemented, control proceeds to step 626 where the remaining tokens are allocated to partially satisfy the request. Control then proceeds to step 620 where the values of the P-Tokens, P-Bucket-Tokens, P-Bucket-Timestamp variables are stored in database 402.

Figure 7A:
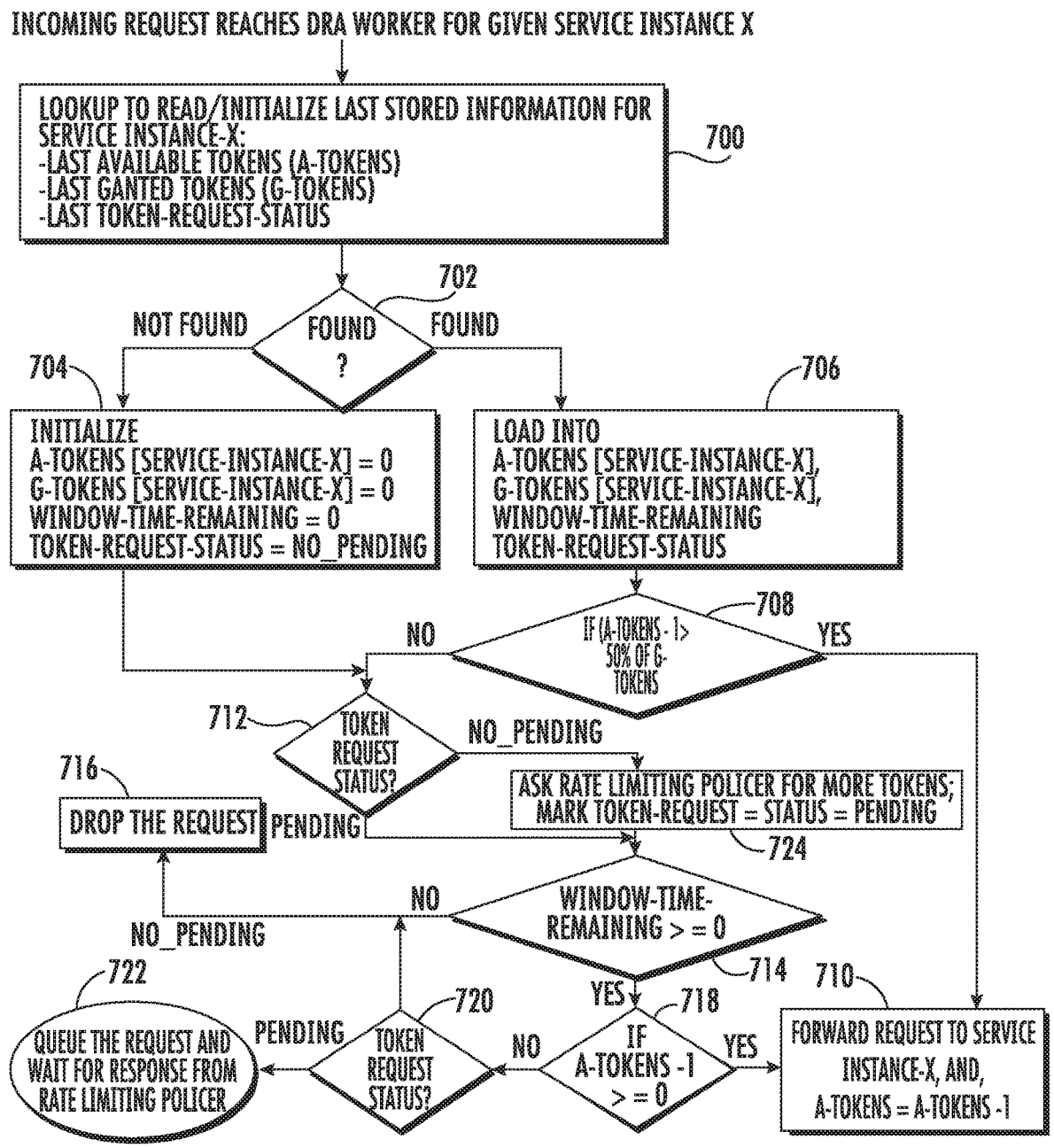
FIG. 7A is a flow chart illustrating a token demanding algorithm that may be implemented by an DRA worker instance.
Figure 7B:
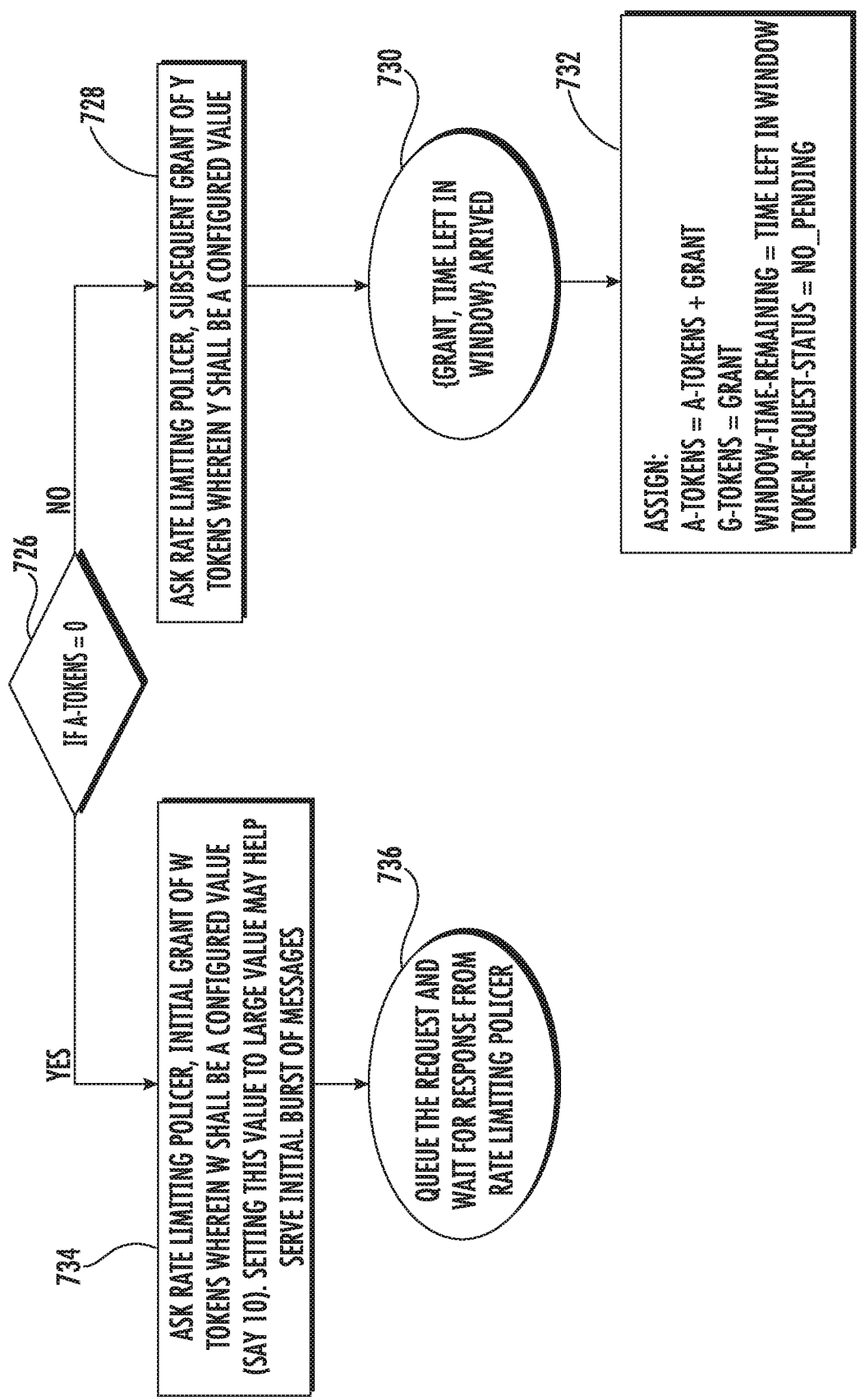
FIG. 7B is a flow chart illustrating a portion of the token demanding algorithm implemented by an DRA worker instance.

As stated above, by implementing rate limiting policing at rate limiting policer 400 separate from the DRA worker instances, the logic of the DRA worker instances is simplified. FIGS. 7A and 7B illustrate the DRA worker instances token demanding algorithm that may by implemented by each DRA worker instance. In general, each DRA worker instance receives requests for a service provided by a Diameter peer, initializes the number of tokens and asks rate limit policer 400 for an initial grant of tokens. For subsequent requests, the DRA worker instance checks whether the number of available tokens is greater than a configurable percentage of the granted tokens and forwards the request. For example, in an aggressive token demanding algorithm, the threshold amount may be set to 50% or higher to anticipate last minute token scarcity. In a less aggressive algorithm the threshold may be set to a lower percentage, such as 25%, to allow the DRA worker instances to nearly deplete their token allocations before demanding more tokens. Subsequent token demands can be fixed in size or in increasing order, e.g., based on a Fibonacci series. DRA worker instances do not need to manage the rate limiting time window traversal. The rate limiting policer will provide remaining time in the current window.

Referring to the flow chart illustrated in FIG. 7A, an DRA worker instance receives a request from a Diameter-based consumer for service provided by a Diameter peer. In step 700, the DRA worker instance performs a lookup in its local database for Diameter peer x to determine the current number of tokens available, the current number of tokens granted, and the last token request status for the given Diameter peer. It is noted that the DRA worker instance is not required to know the rate capacity of the Diameter peer or the amount of available capacity that is being used by other Diameter-based consumers. The database maintained by each DRA worker instance may contain the number of tokens granted by the rate limiting policer to the DRA worker instance for each Diameter peer and the number of those tokens that have not been used.

In step 702, if a record is not found, this means that the DRA worker instance has not requested any tokens for the given Diameter peer during the current time interval. Control then proceeds to step 704 where the DRA worker instance initializes the available tokens for Diameter peer x to 0, the granted tokens for Diameter peer x to 0, the window time remaining to 0, and the token request status to none pending.

If a record is found, this means that the DRA worker instance has already requested tokens during the current time interval for the Diameter peer. If a record is found, control proceeds to step 706 where the DRA worker instance loads the information located in the lookup. The information loaded includes the available tokens for the Diameter peer, the granted tokens for the Diameter peer, the window time remaining, and the token request status. In step 708, the DRA worker determines whether the available tokens minus one is greater than of the above-referenced configurable percentage of the granted tokens. In other words, the DRA worker is going to ask for new tokens if more than half of its existing tokens have been used for the current time interval. This is an aggressive algorithm but may prevent the DRA worker from starving.

If the available tokens minus one is greater than the configurable percentage of the granted tokens, no new tokens are needed and control proceeds to step 710 where the request is forwarded to Diameter peer x and the available tokens variable is decremented to indicate the use of one token to satisfy the request.

If the available tokens minus one is not greater than the configurable percentage of the granted tokens, control proceeds to step 712 where the DRA worker determines whether there is a pending token request for the current time interval. If there is a pending token request, control proceeds to step 714 where it is determined whether there is any time remaining the current window. If there is no time remaining in the current window, the DRA worker drops the token request in step 716. If there is time remaining in the current window, control proceeds to step 718 where the DRA worker determines whether there are any available tokens. If there are available tokens, control proceeds to step 710 where the DRA worker forwards the service request and decrements the number of available tokens. If there are no available tokens, control proceeds to step 720, where it is determined what the pending token request status is. If there is a token status request, control proceeds to step 722 where the request is queued, and the DRA worker waits for the response from the rate limiting policer. If there are no pending token requests, control proceeds to step 716 where the current request is dropped.

In step 712, if there are no pending token requests and the number of available tokens is less than half of the granted tokens, control proceeds to step 724 where the DRA worker requests tokens from the rate limiting policer and marks the pending token status request variable to pending.

FIG. 7B illustrates the token demanding algorithm. In FIG. 7B, in step 723, if the number of the available tokens is equal to zero, control proceeds to step 728 where the DRA worker asks the rate limiting policer for a grant of y tokens where y is configurable value. In step 730, the DRA worker receives a grant with time left in the current window. In step 732, the DRA worker sets the available tokens to the number of currently available tokens plus the grant. The granted tokens variable is set to the number of tokens in the grant. The window time remaining variable is set to the time left in the current window and the token request status is set to no pending requests.

In step 726, if the number of available tokens is equal to zero, control proceeds to step 734 where the DRA worker instance asks the rate limiting policer for an initial grant w tokens, where w is a configurable value. Setting w to be a large value may facilitate serving an initial burst of messages. In step 736, the DRA worker instance waits for grant from the rate limiting policer. When the grant occurs in step 730, control proceeds to step 732 where the DRA worker instance updates its variables to reflect the token grant.

Figure 8:
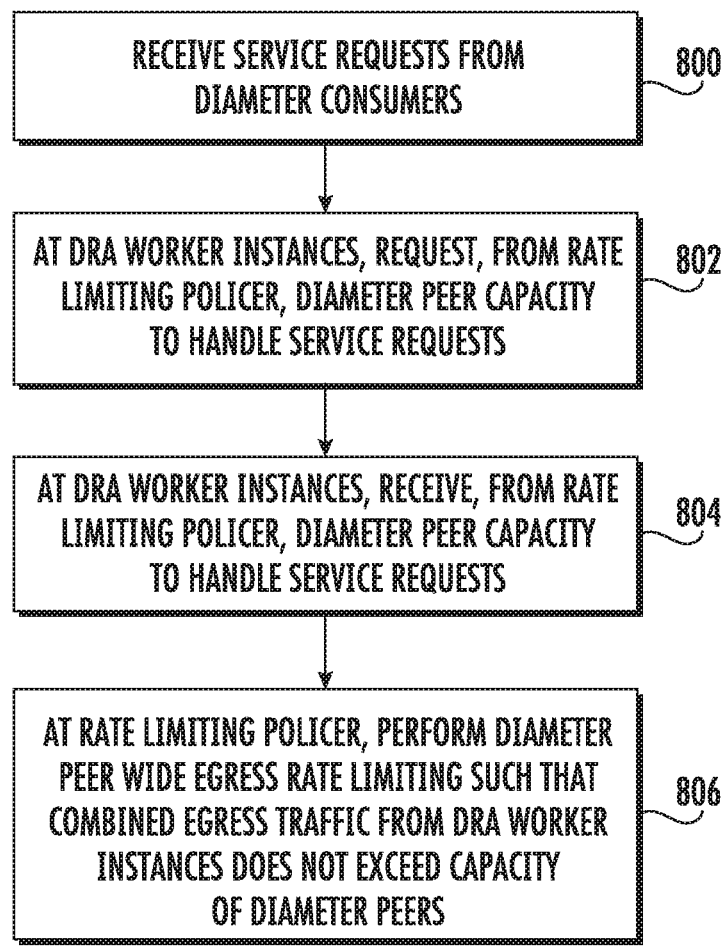
FIG. 8 is a flow chart illustrating an exemplary process for Diameter-peer-wide egress rate limiting.

FIG. 8 is a flow chart illustrating an exemplary process for Diameter-peer-wide egress rate limiting at a DRA. Referring to FIG. 8, in step 800, service requests are received from Diameter-based consumers. For example, DRA 200 may receive service requests from Diameter-based consumers 204 to access services provided by Diameter peers. The service requests may be initiated in response to a UE connecting to the network or initiating a communications session.

In step 802, the service requests are forwarded to DRA worker instances. For example, Diameter-based consumers 204 may send service requests to a single IP address of DRA 200. DRA 200 may forward the requests to DRA worker instances 210 and 212. In one example, DRA 200 may load balance the incoming service requests among DRA worker instances 210 and 212.

In step 804, the DRA worker instances request, from the rate limiting policer, Diameter peer capacity to handle the service requests. For example, DRA worker instances 210 and 212 may request tokens or other indications of Diameter peer capacity from rate limiting policer 400 to handle the service requests. The requests from the DRA worker instances may identify the Diameter peer that provides the service identified in the service requests. The DRA worker instances may be aware of the services provided by the Diameter peers based on service registrations from the Diameter peers.

In step 806, the rate limiting policer performs Diameter-peer-wide egress rate limiting such that combined egress traffic from the DRA worker instances does not exceed the capacities of Diameter peers. For example, rate limiting policer 400 may grant or deny tokens in response to token requests from DRA worker instances 210 and 212 depending on whether the granting of a request would cause the capacity the Diameter peer service selected by the DRA worker instances to be exceeded. If best effort token allocation is implemented, rate limiting policer 400 may partially satisfy a token allocation request with the number of available tokens during at time interval even if the requested number of tokens exceeds the number of available tokens. If best effort token allocation is not implemented, if the requested number of tokens exceeds the number of available tokens, the token allocation request will be denied. As indicated above, rate limiting policer 400 may maintain an in-memory database that it uses to keep track of Diameter peer capacities and portions of that capacity already allocated to Diameter-based consumers. Rate limiting policer 400 may access the database to determine whether to grant or deny each token allocation request.

Accordingly, using the rate limiting policer with a global view of tokens allocated for each Diameter peer, the DRA worker instance token requesting algorithm is simplified. DRA worker instances will not drop service requests when a token demand is in the pending state with rate limiting policer. Pending requests will be queued until a response arrives from the rate limiting policer. This is true for an initial request as well when the worker gets a grant from the rate limiting policer as zero, i.e., the rate exceeded in the current rate limiting window, but there is still time left in the window, request messages received until the time window expires or drops. Subsequent token demands during a time interval can be fixed in size or set to an increasing value, such as based on a Fibonacci series. Thus, using the subject matter described herein, DRA functionality is simplified, and rate limiting is implemented on a per Diameter peer basis. DRA 200 can be implemented as a proxy or API gateway for Diameter peers to perform egress side rate limiting for all Diameter peers accessible through the DRA 200. DRA 200 and/or rate limiting policer 400 can be implemented as an on-premise hardware platform deployed at a user's site or as a service made available via a cloud network.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for Diameter-peer-wide egress rate limiting, the method comprising:
  at a Diameter relay agent (DRA) including at least one processor:
    receiving service requests from Diameter-based consumers;
    forwarding the service requests to DRA worker instances;
    at the DRA worker instances, requesting, from a rate limiting policer separate from the DRA worker instances, the Diameter-based consumers, and upstream Diameter peers to which the service requests are directed, allocations of processing capacity of the upstream Diameter peers for handling the service requests;
  at the rate limiting policer:
    performing Diameter-peer-wide egress rate limiting between the DRA worker instances and the upstream Diameter peers by granting or denying requests for allocations of processing capacity of the upstream Diameter peers from the DRA worker instances such that combined egress traffic from the DRA worker instances does not exceed rate capacities of the upstream Diameter peers; and
    at the DRA worker instances, receiving, from the rate limiting policer, grants of allocations of processing capacity of the upstream Diameter peers to which the service requests are directed, and routing the service requests to the upstream Diameter peers, wherein the rate limiting policer receives, from the DRA worker instances, requests for the allocations of processing capacity for the Diameter-based consumers and transmits responses to the DRA worker instances containing the grants of allocations of processing capacity of the upstream Diameter peers and the DRA worker instances route the service requests to the upstream Diameter peers over Diameter connections that do not involve the rate limiting policer.

2. The method of claim 1 wherein requesting allocations of processing capacity of the upstream Diameter peers from the rate limiting policer includes requesting an allocation of tokens from the rate limiting policer and the tokens are usable by the DRA worker instances to determine whether to grant or deny the service requests.

3. The method of claim 2 wherein performing rate limiting policing includes accessing a database for determining amounts of available tokens for each of the Diameter peers.

4. The method of claim 2 wherein requesting an allocation of tokens includes requesting the allocation of tokens in response to a percentage of granted tokens available to one of the DRA worker instances being less than a threshold amount.

5. The method of claim 2 comprising, at the rate limiting policer, maintaining, for each of the upstream Diameter peers, a maximum limit of tokens that can be allocated in a time interval and granting or denying the requests for allocation of tokens based on whether a number of tokens requested by the requests for allocation of tokens would cause the maximum limit of tokens to be exceeded.

6. The method of claim 5 wherein performing Diameter-peer-wide egress rate limiting includes implementing a fixed window during which tokens can be granted.

7. The method of claim 5 wherein performing Diameter-peer-wide egress rate limiting includes implementing a sliding window during which tokens can be granted.

8. The method of claim 2 wherein performing Diameter-peer-wide rate limiting policing includes implementing best effort token allocation wherein if a number of tokens requested by one of the DRA worker instances during a time interval would cause the maximum allocated tokens during the time interval to be exceeded, granting a remainder tokens available in the time interval that would not cause the maximum limit of tokens to be exceeded.

9. The method of claim 2 wherein performing Diameter-peer-wide egress rate limiting includes implementing max limit token allocation by denying a request for allocation of tokens if a requested number of tokens would cause the maximum limit of tokens to be exceeded.

10. The method of claim 1 wherein the DRA implements at least one Diameter relay or routing function.

11. A system for Diameter-peer-wide egress rate limiting, the system comprising:
a Diameter relay agent (DRA) including at least one processor for receiving service requests from Diameter-based consumers, forwarding the service requests to DRA worker instances implemented by the DRA, and requesting, by the DRA worker instances, allocations of processing capacity of upstream Diameter peers to which the service requests are directed; and
a rate limiting policer separate from the DRA worker instances, the Diameter-based consumers, and the upstream Diameter peers to which the service requests are directed for performing Diameter-peer-wide egress rate limiting between the DRA worker instances and Diameter peer instances by granting or denying requests for Diameter peer capacity from the DRA worker instances such that combined egress traffic from the DRA worker instances does not exceed rate capacities of the upstream Diameter peers, wherein the DRA worker instances receive, from the rate limiting policer, grants of allocations of processing capacity of the upstream Diameter peers to which the service requests are directed and route the service requests to the upstream Diameter peers, wherein the rate limiting policer receives, from the DRA worker instances, requests for the allocations of processing capacity for the Diameter-based consumers and transmits responses to the DRA worker instances containing the grants of allocations of processing capacity of the upstream Diameter peers and the DRA worker instances route the service requests to the upstream Diameter peers over Diameter connections that do not involve the rate limiting policer.

12. The system of claim 11 wherein the DRA worker instances are configured to request allocations of processing capacity of the upstream Diameter peers from the rate limiting policer by requesting an allocation of tokens from the rate limiting policer, wherein the tokens are usable by the DRA worker instances to determine whether to grant or deny the service requests.

13. The system of claim 12 comprising a database accessible by the rate limiting policer for determining amounts of available tokens for each of the upstream Diameter peers.

14. The system of claim 11 wherein the DRA worker instances are configured to request an allocation of tokens in response to a percentage of granted tokens available to one of the DRA worker instances being less than a threshold amount.

15. The system of claim 12 wherein the rate limiting policer is configured to maintain, for each of the Diameter peers, a maximum limit of tokens that can be allocated a time interval and to grant or deny the requests for allocation of tokens based on whether a number of tokens requested by the requests for allocation of tokens would cause the maximum limit of tokens to be exceeded.

16. The system of claim 15 wherein the rate limiting policer is configured to perform Diameter-peer-wide egress rate limiting by implementing a fixed window during which tokens can be granted.

17. The system of claim 15 wherein the rate limiting policer is configured to perform the Diameter-peer-wide egress rate limiting by implementing a sliding window during which tokens can be granted.

18. The system of claim 12 wherein the rate limiting policer is configured to performing the Diameter-peer-wide rate limiting policing by implementing best effort allocation wherein if a number of tokens requested by one of the DRA worker instances during a time interval would cause the maximum allocated tokens during a time interval to be exceeded, granting a remainder tokens available in the time interval that would not cause the maximum limit of tokens to be exceeded.

19. The system of claim 12 wherein the rate limiting policer is configured to perform Diameter-peer-wide egress rate limiting by implementing max limit token allocation, which includes denying a request for allocation of tokens if a requested number of tokens would cause the maximum limit of tokens to be exceeded.

20. A non-transitory computer readable medium having stored thereon executable instructions that when executed by the processor of a computer control the computer to perform steps comprising:
at a Diameter relay agent (DRA) including at least one processor:
receiving service requests from Diameter-based consumers;
forwarding the service requests to DRA worker instances; and
at the DRA worker instances, requesting, from a rate limiting policer separate from the DRA worker instances, the Diameter-based consumers, and upstream Diameter peers to which the service requests are directed, allocations of processing capacity of the upstream Diameter peers capacity for handling the service requests;
at the rate limiting policer, performing Diameter-peer-wide egress rate limiting between the DRA worker instances and the upstream Diameter peers by granting or denying requests for allocations of processing capacity of the upstream Diameter peers from the DRA worker instances such that combined egress traffic from the DRA worker instances does not exceed rate capacities of the Diameter peers; and at the DRA worker instances, receiving, from the rate limiting policer, grants of allocations of processing capacity of the upstream Diameter peers to which the service requests are directed, and routing the service requests to the upstream Diameter peers, wherein the rate limiting policer receives, from the DRA worker instances, requests for the allocations of processing capacity for the Diameter-based consumers and transmits responses to the DRA worker instances containing the grants of allocations of processing capacity of the upstream Diameter peers and the DRA worker instances route the service requests to the upstream Diameter peers over Diameter connections that do not involve the rate limiting policer.

\* \* \* \* \*

UNITED STATES PATENT AND TRADEMARK OFFICE
CERTIFICATE OF CORRECTION

Page 1 of 1

PATENT NO. : 11,159,359 B2
APPLICATION NO. : 16/697021
DATED : October 26, 2021
INVENTOR(S) : Goel It is certified that error appears in the above-identified patent and that said Letters Patent is hereby corrected as shown below:

On the Title Page

On page 3, Column 1, Item (56) under Other Publications, Line 41, delete "Netwok" and insert -- Network --, therefor.

On page 3, Column 1, Item (56) under Other Publications, Line 48, delete "TripIe" and insert -- Triple --, therefor.

On page 4, Column 2, Item (56) under Other Publications, Line 29, delete "Pane" and insert -- Parte --, therefor.

In the Drawings

On sheet 7 of 9, in FIG. 7A, under Reference Numeral 700, Line 4, delete "GANTED" and insert -- GRANTED --, therefor.

In the Specification

In Column 5, Line 25, delete "Architecture enhancements" and insert the same in Column 5, Line 24 as the continuation of same paragraph.

In Column 6, Line 8, delete "(aSs)" and insert -- (ASs) --, therefor.

In Column 11, Line 32, delete "may by" and insert -- may be --, therefor.

Signed and Sealed this
First Day of March, 2022

Drew Hirshfeld
*Performing the Functions and Duties of the
Under Secretary of Commerce for Intellectual Property and
Director of the United States Patent and Trademark Office*